3,271,327
PREPARATION OF SUPPORTED PALLADIUM CATALYSTS
James E. McEvoy, Morton, and Harold Shalit, Drexel Hill, Pa., assignors to Air Products and Chemicals, Inc., Philadelphia, Pa., a corporation of Delaware
No Drawing. Filed May 29, 1963, Ser. No. 283,956
3 Claims. (Cl. 252—472)

The present invention relates to the production of supported catalysts and in particular to a method for obtaining peripheral distribution of palladium on a carrier or support material.

Palladium catalysts have been found to be unusually effective in various catalytic processes—particularly hydrogenation processes. For example, such catalysts find utilization in the production of hydrogen peroxide from alkylated anthraquinones.

However, as with other supported catalysts, the activity and performance of palladium catalysts depend on numerous factors such as the amount of palladium present in the catalyst, the type of support, the method by which the palladium is deposited, and the distribution of the palladium on the support.

Typically, palladium catalysts are prepared by permitting palladium salt to be absorbed from a solution onto a carrier. In a known procedure heretofore employed, the salt is then treated with a water-soluble metal hydroxide or carbonate to form a hydrated oxide or basic carbonate which is thereafter reduced to metallic palladium. While this procedure, as well as other conventional methods for preparing palladium catalysts, is satisfactory when the particle size of the support material is relatively small, known techniques for depositing palladium on support material decrease in effectiveness as the particle size of the support material increases.

The methods of producing supported palladium catalysts as heretofore practiced are further deficient in that the resultant catalyst often does not have maximum catalytic efficiency. Such efficiency is obtained when the palladium, rather than being distributed throughout the entire carrier where the palladium is inaccessible to the catalytic reactants, is deposited on the surface of the support material. Using conventional methods, however, it is difficult to obtain a thin, firm and adherent coating of palladium on the support material. This problem is particularly acute when the support material is smooth and relatively non-porous.

It is an object of the invention to provide a method for preparing palladium catalysts having peripheral distribution of the palladium on the support.

It is another object of the invention to provide a method for preparing palladium catalysts using support material of relatively large particle size.

It is a further object of the invention to provide a method for depositing a firm and adherent coating of palladium on support material by a procedure which may be employed regardless of the surface characteristics of the support.

Other objects and advantages of this invention will become apparent from the following description.

The method of the present invention involves, broadly, contacting a carrier or support material with an aqueous solution of palladium chloride and hydrochloric acid which has been neutralized (i.e., treated to adjust the pH) to a pH of 4.0 to 6.5 in a manner more fully specified hereinafter, holding the material for a period of wet aging and then drying the resulting hydrated palladium oxide catalyst. For use in hydrogenation reactions, these catalysts require no pre-activation since they are in effect activated by the hydrogen supplied during the reactions themselves.

Since anhydrous palladium chloride ($PdCl_2$) is not readily soluble in water but is soluble in dilute hydrochloric acid, the aqueous soltuion of palladium chloride employed in the practice of this invention contains sufficient HCl to keep the palladium in solution.

Immediately prior to contacting the support material, the palladium chloride solution is neutralized to between 4.0 to 6.5 and preferably 5.8 to 6 pH with a base such as sodium bicarbonate. This neutralization operation is critical and the addition of the base (which may be the hydroxide, carbonate or bicarbonate of an alkali metal such as sodium or potassium) is at a steady slow rate with vigorous agitation to insure rapid, complete mixing. Formation of colloidal $PdO.H_2O$ occurs which at this pH exhibits slow growth to macro-crystallites.

The support material may be contacted with the aqueous solution of palladium chloride which has been neutralized to a pH between 4.0 to 6.5 by any means conventional in the art but preferably the neutralized palladium chloride solution is syrayed onto a tumbling bed of granular material.

The volume of neutralized solution used is determined by a practice designated as the "no excess solution" technique. According to this technique, the quantity of liquid necessary is determined by allowing a measured weight of support to attain equilibrium with sufficient liquid to completely cover the support. After equilibrium is attained, the entire mass is allowed to drain on a screen for 10 minutes. The amount of liquid retained on the support after this drainage (as determined by the increase in weight) is the amount used for every measured weight of support. Thus, all of the neutralized palladium solution is utilized leaving no excess solution on completion of the treatment of the support material.

To insure a uniform distribtuion of the neutralized palladium solution on the surface of all the individual granules, using the preferred technique, tumbling of the support material is continued for a period beyond that required for the spraying.

The granules are then held for wet aging or placed in other containers for this purpose. The period for wet aging should be more than 8 but generally less than 56 hours. During this period, the palladium in the colloidal solution coagulates and deposits as palladium oxide on the surface of the support material. Temperature during this time is important—the containers being maintained generally above about 70° F. but below 85° F. At 110–120° F., the growth of crystallites is significantly more rapid and the period for wet aging may be reduced to 4 hours. On the other hand, four days are required if the temperature is 40° F.

After the period for wet aging, the containers are filled with sufficient aqueous solution comprising either the hydroxide, carbonate or bicarbonate of an alkali metal to cover the granules. This solution is not immediately drained from the containers but is allowed to remain for a period which is relatively short as compared to that for wet aging. Preferably, the drained solution is then poured back into the chambers and held for a like period before final draining.

One or more water washings are then made. The drained liquors may be collected for subsequent recovery of palladium.

The support material is then removed from the aging containers and dried at room temperature with either air through circulation or inert gas at atmospheric or reduced pressure. It is important that the temperature level during drying be maintained in the vicinity of 70–85° F. and never be allowed to exceed 140° F. As distinguished from supported palladium catalyst prepared by conventional methods the dried catalyst is ready for use in hydrogenation reactions and no reduction is necessary. The coating of palladium oxide on the carrier thus obtained is extremely firm and adherent.

The method of the present invention while suitable for the production of highly active powder catalysts is especially valube for the manufacture of supported catalysts having granular or preformed carriers, such as pellets, tablets, pills, etc., having a particle size greater than 50 mesh (U.S.) The proportion of palladium oxide present on the supported catalyst can be varied according to the purpose for which the catalyst is intended. This catalyst may be prepared in the manner described containing palladium oxide in the range of 0.01 to 6% by weight based on the total weight of supported catalyst but generally the amount of palladium oxide will not exceed 1% by weight of the catalyst.

The invention is further clarified by reference to the following examples.

EXAMPLE I

An aqueous solution of palladium chloride containing 100 grams of Pd per liter plus free HCl in quantity sufficient to keep the palladium in solution was prepared from 99.9+% purity palladium metal and high purity HCl.

This palladium chloride solution was slowly neutralized with vigorous stirring to pH 6.0. Neutralization was accomplished by addition of $NaHCO_3$ over a one hour period.

The neutralized solution was then thoroughly mixed with 5–6 mesh kaolin cracking catalyst and allowed to "age" for 72 hours at room temperature. Sufficient 5% $NaHCO_3$ solution was added to the aged mix to completely cover the pellets. After four hours, the added $NaHCO_3$ solution was drained.

The catalyst was then washed six times with water (allowing two hours for each wash). Drying is accomplished by air through circulation at 70–80° F. for two hours or two one hour acetone treatments to displace $H_2O$ followed by a one hour air dry at room temperature.

Analysis of the catalyst showed a 0.48 weight percent PdO content (dry basis) indicating good palladium retention. Palladium oxide was distributed on the peripheral portion of each kaolin particle with penetration to no more than 10% of the particle volume.

EXAMPLE II

The resulting catalyst, obtained by the procedure of Example I, was utilized to remove traces of oxygen from hydrogen in process streams by converting the oxygen to water.

Specifically a feed gas composition having 190 p.p.m. $O_2$ in $H_2$ was fed through a bed containing 50 cc. of the catalyst. At flow rates as high as 32,000 cc./min. it was found that only 1.2 p.p.m. of oxygen remained in the hydrogen stream after passing through the catalyst bed.

EXAMPLE III

Activated carbon having a particle size allowing it to pass through 200 mesh was contacted with an aqueous solution of palladium chloride and hydrochloride acid.

Following 24 hours of aging at about 70° F., sodium bicarbonate was added to the catalyst. The catalyst was water washed and then dried at room temperature.

The resulting catalyst had good catalytic activity. However, when the identical procedure was applied to activated 4–6 mesh carbon, the resulting catalyst was almost completely inactive.

EXAMPLE IV

Employing the no-excess solution technique, 4–6 mesh granular carbon was contacted with an aqueous solution of palladium chloride which had been neutralized to 5.8 pm immediately prior to use.

The catalyst was allowed to age for 24 hours at room temperature. Thereafter, the catalyst was treated with sodium bicarbonate, washed with water, and finally dried at room temperature.

It was found that this time, palladium oxide had deposited on the periphery of the support material resulting in a catalyst having an activity 30 times greater than the most active catalyst prepared in the previous example from the same particle size carbon.

While supported catalysts, as illustrated above, may be prepared by the practice of the present invention utilizing relatively porous carriers such as activated carbon, alumina, magnesia, pumice, charcoal, silica gel, titania, chromia and kaolin, the instant method finds particular utility with respect to relatively nonporous and smooth support material such as the carbonates of the alkaline earth metals, e.g., magnesium carbonate, calcium carbonate, strontium carbonate, barium carbonate, the carbides of magnesium, silicon, aluminum, titanium and zironcium and the oxides of silicon, aluminum, titanium and zirconium. This particular applicability of the invention to nonporous support material and especially to such material having a relatively smooth surface lies in the fact that a controlled application and peripheral distribution of palladium oxide on the support is possible. Unexpectedly the problem of getting palladium oxide to "stick" to nonporous material has been overcome and up to 1% of palladium oxide may be applied to the surface of such support material. It is to be understood that even additional palladium oxide could, if desired, be applied to the surface of such carriers but that in most instances such application would only result in causing one layer of palladium oxide to be applied over another such layer. As in the case where palladium oxide is distributed throughout the carrier, palladium oxide present on bottom layers is generally less accessible to reactants. Thus a thin peripheral distribution of palladium oxide on support material has been the desideratum of the art.

EXAMPLE V

Aqueous palladium chloride solution described in Example I was neutralized to 6 pH just prior to its application to dolomite granules obtained by crushing and drying irregular shaped, hard and essentially nonporous granules of dolomitic limestone. The chemical composition of these granules is shown in Table 1.

*Table 1*

| | Percent |
|---|---|
| $CaCO_3$ | 54.5 |
| $MgCO_3$ | 44.8 |
| $Al_2O_3$ | 0.15 |
| $SiO_2$ | 0.25 |
| $Fe_2O_3$ | 0.05 |
| $SO_3$ | 0.25 |

A 350 pound batch of the dolomitic granules having a 10–16 mesh size was placed in an impregnator bowl and neutralized palladium chloride solution containing 476 grams of Pd was sprayed into the impregnator bowl while it was rotated. The spraying was completed in 2–3 minutes but rotation of the bowl was continued for 30 minutes to insure a uniform distribution of the solution on the surfaces of all the individual granules of dolomite.

The treated granules were removed from the impregnator and placed in rubber lined pots where they were held at a temperature between 70 and 85° F. for wet aging. During this period of wet aging palladium oxide in the colloidal solution deposited on the surface of the dolomite granules.

After 48 hours of aging each pot was filled with sufficient 10% by weight sodium bicarbonate solution to just cover the granules. The sodium bicarbonate solution was held in the pots for about 1 hour before being drained off, poured back into the pots and held another hour before draining. Five water washes of 15 minutes duration each were then made and the pots finally allowed to drain thoroughly.

The granules were then removed from the pots, and spread on trays for drying. Air was gently circulated over the trays while the temperature was held in the vicinity of 70–85° F.

Upon analysis, the granules were shown to have peripheral distribution of the palladium oxide and a palladium oxide content of 0.265%.

Obviously, many modifications and variations of the invention as hereinbefore set forth may be made without departing from the spirit and scope thereof, and therefore only such limitations should be imposed as are indicated in the appended claims.

What is claimed is:

1. The method of producing supported hydrated palladium oxide catalysts having peripheral distribution of palladium oxide on substantially non-porous support material, comprising neutralizing an aqeuous solution of palladium chloride and hydrochloric acid to a pH between 4 to 6.5 by the addition of a base, contacting the substantially non-porous support material with the neutralized solution, holding the treated support material for wet aging at a temperature between 70 to 85° F. and then drying the resulting supported catalyst at a temperature below 140° F.

2. The method of producing supported hydrated palladium oxide catalysts having peripheral distribution of palladium oxide on substantially non-porous support material, which comprises neutralizing an aqueous solution of palladium chloride and hydrochloric acid to a pH between 4.0 to 6.5, contacting the substantially non-porous support material with the neutralized solution, holding the treated support for wet aging at a temperature between 70 to 85° F. for at least 8 hours, adding a solution selected from the group consisting of the hydroxide, carbonate and bicarbonate of an alkali metal to the support material, draining the solution from the support material, washing said material and then drying the resulting supported catalyst at a temperature below 140° F.

3. The method of producing supported hydrated palladium oxide catalysts having a peripheral distribution of palladium oxide on substantially non-porous support material, comprising neutralizing an aqeuous solution of palladium chloride and hydrochloric acid to a pH between 5.8 to 6.0, contacting the substantially non-porous support material with the neutralized solution, holding the treated support material for wet aging at a temperature between 70 to 85° F. for 8 to 56 hours and then drying the resulting supported catalyst at a temperature below 140° F.

References Cited by the Examiner

UNITED STATES PATENTS

| 2,731,497 | 1/1956 | McCormick et al. | 252—447 |
| 2,857,337 | 10/1958 | Hamilton et al. | 252—447 |

FOREIGN PATENTS 580,897    9/1946.    Great Britain.

OSCAR R. VERTIZ, *Primary Examiner.*

MAURICE A. BRINDISI, BENJAMIN HENKIN,
*Examiners.*

R. D. EDMONDS, H. S. MILLER, E. J. MEROS,
*Assistant Examiners.*